July 22, 1969     J. I. SCHWARTZ     3,456,484
TRANSDUCER CALIBRATION SYSTEM
Filed Feb. 10, 1966     3 Sheets-Sheet 1

INVENTOR.
JOSEPH I. SCHWARTZ
BY
ATTY.

July 22, 1969  J. I. SCHWARTZ  3,456,484
TRANSDUCER CALIBRATION SYSTEM
Filed Feb. 10, 1966  3 Sheets-Sheet 2

INVENTOR.
JOSEPH I. SCHWARTZ
BY
ATTY.

United States Patent Office
3,456,484
Patented July 22, 1969

3,456,484
TRANSDUCER CALIBRATION SYSTEM
Joseph I. Schwartz, Ellicott City, Md., assignor to the United States of America as represented by the Secretary of the Navy
Filed Feb. 10, 1966, Ser. No. 526,632
Int. Cl. G01l 25/00; G01h 1/00
U.S. Cl. 73—1   3 Claims

ABSTRACT OF THE DISCLOSURE

A system for calibrating vibration analyzers including both exciter and measuring subsystems. The exciter system is an electrically driven vibration shaker driven by a variable frequency oscillator. The measuring system includes a previously calibrated vibration transducer and suitable processing equipment so that when it is placed upon the vibration shaker with the transducer to be calibrated, the outputs may be compared.

---

The invention described herein may be manufactured and used by or for the Government of the United States of America for governmental purposes without the payment of any royalties thereon or therefor.

This invention relates to calibrating systems and more particularly to a system and method for calibrating vibration analyzing devices such as are used to test rolling contact bearings.

It has been common practice to make vibration inspection tests on sample lots of ball bearings before they are put into use. Such tests provide a measure of the overall quality of the bearings in terms of the quietness of operation. Silent operation can be an important factor in certain environments such as on board submarines where noise must be kept to a minimum level to prevent sound detection by an enemy. Heretofore, vibration testing of this type has been restricted to a small number of installations due to the inability to achieve interlaboratory reproducibility of the vibration test in quantitative terms. A particular difficulty with the test is the problem of calibration of the vibration analyzer together with associated equipment. It has been found that one of the most useful indexes of bearing performance is in terms of units having velocity dimensions. The vibration analyzer, in essence, measures these velocity parameters. Consequently, a suitable calibration system necessitates simulation of the velocities which the analyzer indicates. Heretofore, this has not been possible with assurance of interlaboratory duplication. Therefore, resort was made to static calibration systems which gave only approximate correlation with the velocity measurement system. For instance either the entire system from the transducer pickup to the output meter could not be calibrated as a unit or only the electronic components of the system could be calibrated. Furthermore, highly trained personnel and expensive equipment such as optical interferometers were required.

Accordingly, it is an object of the present invention to provide a calibration system for vibration analyzing devices which can be readily and uniformly applied in every instance and which requires a minimum of specialized equipment and training of personnel.

A further object of this invention is to provide a calibration system and method for vibration analyzers which is capable of calibrating the transducer pickup as well as the vibration analyzer. In addition, a built-in check for the calibrator system is provided so that system malfunctions may be readily detected.

Basically, the calibration system is comprised of two major subsystems: an exciter system and a measuring and recording system for use in conjunction with the vibration analyzer and its associated transducer pickup. The exciter system comprises essentially a magnetic vibration shaker driven by a variable frequency oscillator. The measuring and recording system includes a previously calibrated transducer used for comparison purposes, an integrator, amplifiers, matching networks and a graphic level recorder.

The two subsystems are interconnected, in conjunction with the vibration analyzer, to provide calibration for the vibration analyzer transducer pickup as well as the vibration analyzer itself. The magnetic shaker is fed with the amplified output from the oscillator which is swept through the frequency range of interest thus driving the shaker through the same range. The unknown pickup as well as a reference pickup are connected to the shaker. The outputs of the transducers are appropriately processed and compared, the unknown transducer being calibrated against the reference standard transducer.

The vibration analyzer is calibrated by feeding into it the output of the now calibrated transducer pickup which is excited by the shaker over the frequency range of interest.

Finally, means are provided to ascertain any malfunctioning in the calibrating system itself by noting the plot of the graphic level recorder.

For a more complete description of the invention, reference may be had to the following detailed description of one specific embodiment thereof and to the accompanying drawings, in which.

Figure 1:
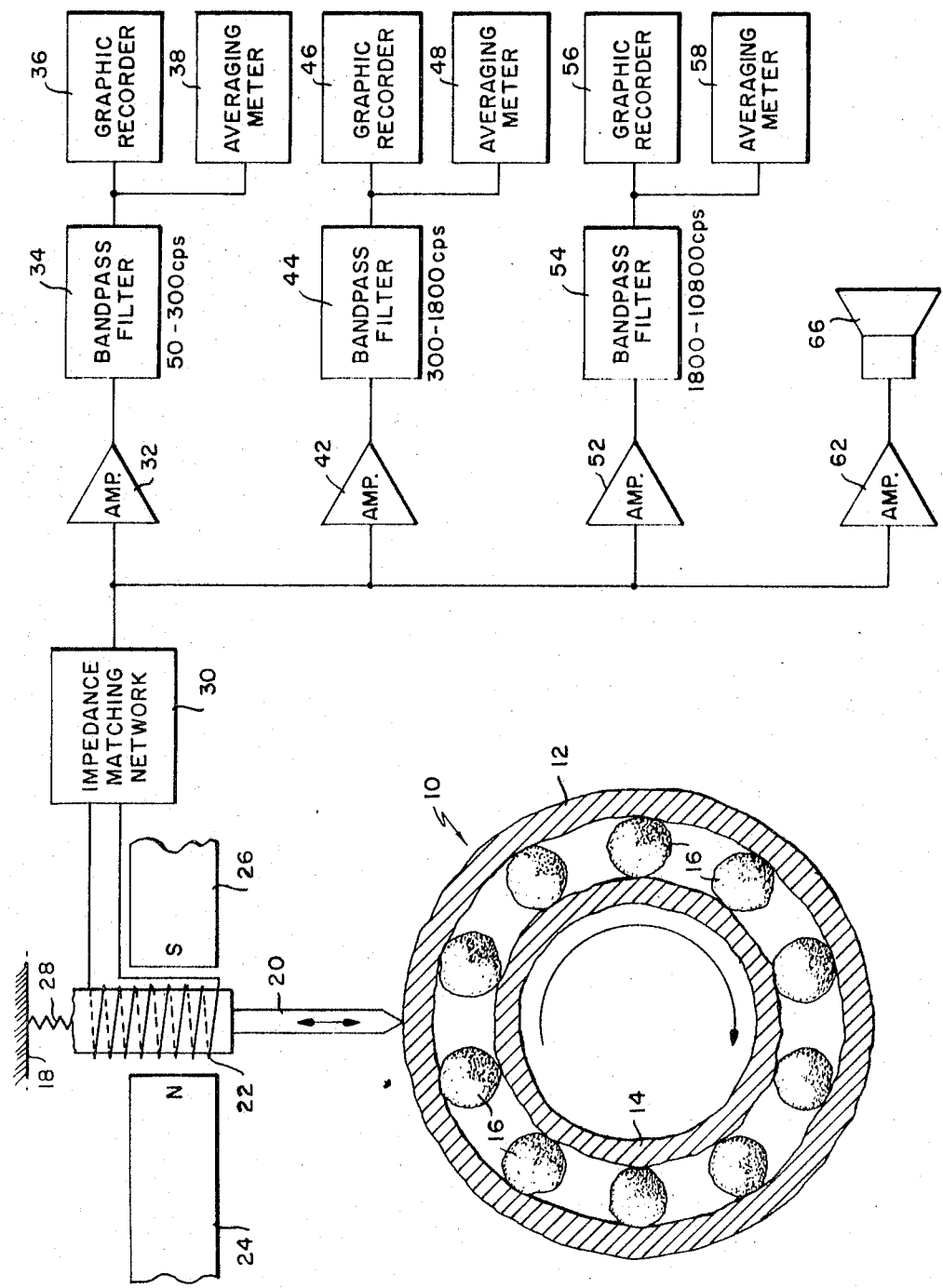
FIG. 1 is a partial sectional view of one specific embodiment of the bearing vibration analyzer together with its associated electrical circuitry.

Referring now to the drawings, FIG. 1 shows a well-known type of vibration analyzer employed to inspect ball bearings similar to the one described in U.S. Patent No. 2,468,648 and known in the industry as a "Anderometer." The analyzer includes a transducer or pickup comprising a sensing probe 20. A wire coil 22 is mounted on one end of probe 20 and the assembly is placed within a magnetic field established by poles 24 and 26 of a permanent magnet. Probe 20 is placed against the outer race 12 of ball bearing 10 and is urged into contact with outer race 12 by means of a small spring 28 fastened to support mounting 18.

An electrical connection is made from coil 22 of pickup 20 and impedance matching network 30. Connected to matching network 30 are three measurement channels providing graphic records and meter indications within a given frequency band. A first channel comprises an amplifier 32 connected to the output of network 30. Amplifier 32 is connected to a bandpass filter 34 which provides response in the frequency range of 50 to 300 c.p.s. Bandpass filter 34 is connected to graphic level recorder 36 and averaging meter 38. A second channel comprises amplifier 42 connected to bandpass filter 44 providing response in the frequency range of 300 to 1800 c.p.s. Filter 44 is connected to graphic recorder 46 and averaging meter 48. The third channel comprises amplifier 52 connected to bandpass filter 54 providing response in the 1800 c.p.s. to 10.8 kc./s. frequency range. Filter 54 is connected to graphic recorder 56 and averaging meter 58. In addition to the three quantitative measuring channels, an amplifier 62 and loudspeaker 66 are connected to network 30 to provide qualitative indications of the "noisiness" of the bearings being tested to the operator of the analyzer.

A typical bearing 10 which is to be tested consists of a cylindrical inner race 14 and outer race 12 in mutual contact with a set of balls 16. The irregularities in the balls and races are shown greatly exaggerated in the drawing for purposes of illustration. In an operative environment these irregularities and deviations from circularity are the factors which cause undesirable noisiness. As the surfaces roll and slide over each other, the imperfections cause the bearing to execute modes of vibration in a wide range of frequencies in directions perpendicular to the axis of the bearing. The vibration analyzer is basically a device to measure these vibration modes and, further, to allocate the contribution to the total vibration that each component of the bearing makes.

It has been found that a convenient manner of analyzing bearing vibration involves breaking the vibration frequency spectrum of the bearing into three ranges and obtaining a figure of merit for each range. In particular, the entire spectrum of undesired response extends from about 50 c.p.s. to 10.8 kc. or the major portion of the audio spectrum. It has been noticed that the vibration produced by the inner race of the bearing contributes predominately to the response in the 50 to 300 c.p.s. range. The vibrations produced by the balls and outer race are most felt in the 300 c.p.s. to 1800 c.p.s. band. Finally, the response in the 1800 c.p.s. to 10.8 kc./s. range is the result of a factor called waviness or chatter, well-known in the bearing art.

In operation bearing 10 is mounted on a spindle, not shown, which causes inner race 14 to rotate. Outer race 12 is prevented from rotation while probe 20 is urged against it by spring 28. As inner race 14 rotates, the bearing irregularities and deformations are translated into radial motion which is transmitted to probe 20. Probe 20 thus moves in a lateral direction being displaced by an amount proportional to the degree of irregularity of the bearing. As probe 20 moves, wire coil 22 cuts the lines of flux set up by magnetic poles 24 and 26. A small voltage is induced in coil 22 which is proportional to the velocity of the movement of probe 20. The voltage from coil 22 is fed into impedance matching network 30 which transforms the low impedance of the velocity transducer into a high impedance to match more efficiently the measuring channels of the analyzer.

Each of the three measuring channels processes the incoming signal so that a useful indication is registered on a recorder or suitable meter. The first measuring channel amplifies the signal from matching network 30 in amplifier 32. Filter 34 allows frequencies in the band from 50 c.p.s. to 300 c.p.s. to pass through while frequencies outside of the band are highly attenuated. The output of filter 34 is fed into a graphic recorder 36 and averaging meter 38. Graphic recorder 36 provides a permanent record of the instantaneous movements of the probe 20 as a function of time, useful for detailed analysis of a particular bearing. As an alternative an oscilloscope may be utilized to provide an indication of the instantaneous movements of probe 20. In addition to graphic recorder 36, an average value meter 38 is provided to enable numerical values to be readily ascertained. For purposes of evaluation and comparison of the bearings, numerical values are more convenient than the graphic record. As described more fully in U.S. Patent No. 2,468,648, the most useful indication of bearing vibration is in terms of velocity units called anderons. The anderon unit takes into account the amount of radial displacement of the probe per relative angular displacement of the bearing races per ratio of the wavelength of the longest and shortest circumferential irregularities. Accordingly, meter 38 may be calibrated directly in anderon units by means of the techniques of this invention.

A second measurement channel is provided for the 300 to 1800 c.p.s. range consisting of amplifier 42, bandpass filter 44, graphic recorder 46 and averaging meter 48. Finally, a third channel for measuring response in the 1800 c.p.s. to 10.8 kc./s. range comprises amplifier 52, bandpass filter 54, graphic recorder 56 and averaging meter 58. In addition, amplifier 62 and loud speaker 66 are connected to matching network 30 to provide aural indications for qualitative testing purposes.

Figure 2:
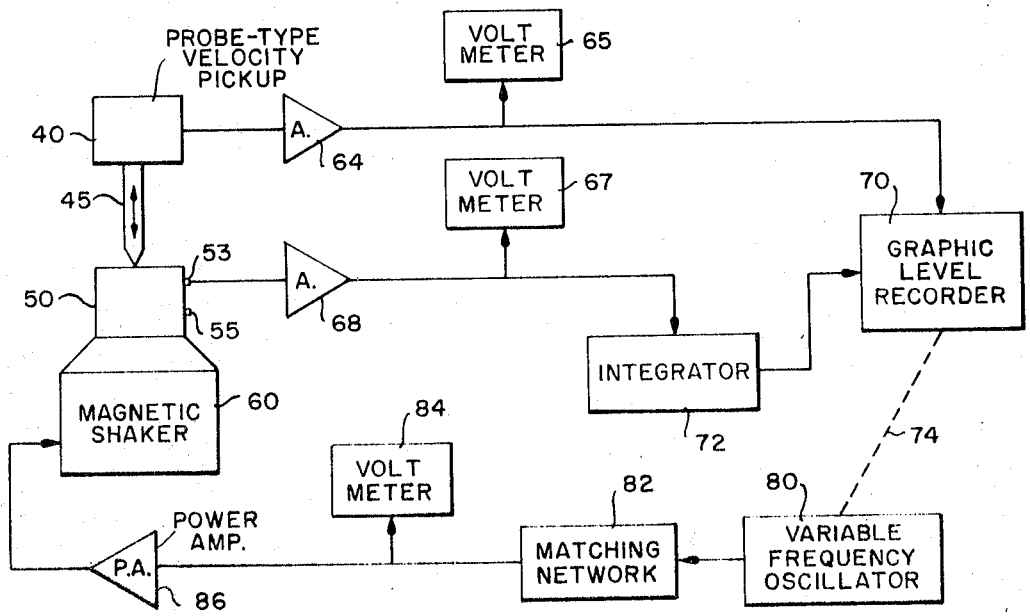
FIG. 2 is a circuit diagram of the velocity pickup calibration system.

Referring now to FIG. 2 of the drawings, a system is shown for calibrating probe-type velocity pickup 40. The pickup calibration system includes a magnetic shaker 60. Magnetic shaker 60 is essentially a transducer for converting electrical oscillations into mechanical motion. Several devices are available for this application which operate on the principle of an axially moving armature surrounded by a wire coil which establishes a magnetic field. As an example, Model 2953 Force Generator built by the Endevco Corporation, Pasadena, Calif. would be suitable for this application. Mounted on shaker 60 is a previously calibrated transducer or reference impedance head 50 having outputs 53 and 55 yielding voltages proportional to acceleration and force, respectively. The response of impedance head 50 is linear with respect to frequency. The velocity pickup 40 is mounted with probe 45 in contact with impedance head 50 such that magnetic shaker 60 will excite impedance head 50 and pickup 40 into simultaneous vibration. The electrical output of pickup 40 is connected to amplifier 64 which is connected to one input of graphic level recorder 70. Voltmeter 65, connected to the output of amplifier 64, serves as a monitoring meter.

The acceleration voltage output 53 of impedance 50 is connected to amplifier 68 which is monitored by voltmeter 67. The output of amplifier 68 is connected to an integrating network 72 which may be built around an operational amplifier and thence to an input of recorder 70.

Graphic level recorder 70 is preferably of the chart driven servomechanism type as, for example, General Radio Corp. Model No. 1521–A. Recorder 70 is connected by mechanical drive 74 to variable frequency oscillator 80. Recorder 70 plots a graph of input response versus frequency and drives a chart in synchronization with oscillator 80 by means of drive 74 so that the system may be readily calibrated over the entire frequency range of interest.

The output of oscillator 80 is connected to a suitable impedance matching network 82 which is monitored by voltmeter 84. A connection is made between matching network 82 and power amplifier 86 and thence to the input of magnetic shaker 50.

Pickup 40 is calibrated by comparison with reference impedance head 50 in the following manner. Variable frequency oscillator 80 is swept through the frequency range of interest, 50 c.p.s. to 10.8 kc./s. while driving the chart of graphic level recorder 70 by means of mechanical drive 74. The oscillations are highly amplified in power amplifier 86 which drives magnetic shaker 60 at the same frequency as the oscillations. Magnetic shaker 60 causes the reference impedance head 50 and probe 45 of pickup 40 to be driven into simultaneous vibration. The voltage output of pickup 40 is amplified by amplifier 64 and fed into one input of recorder 70.

The acceleration voltage output 53 of reference impedance head 50 is amplified in amplifier 68 and fed into integrating network 72. Integrating network 72 integrates the incoming acceleration voltage thus yielding a voltage representative of velocity which is fed into an input of recorder 70.

Recorder 70 plots a graph of velocity response versus frequency for both the reference impedance head 50 and pickup 40. Consequently, the response of pickup 40 may be visually compared with the response of impedance head 50 and, using the latter as a reference standard, may be calibrated directly.

Figure 3:
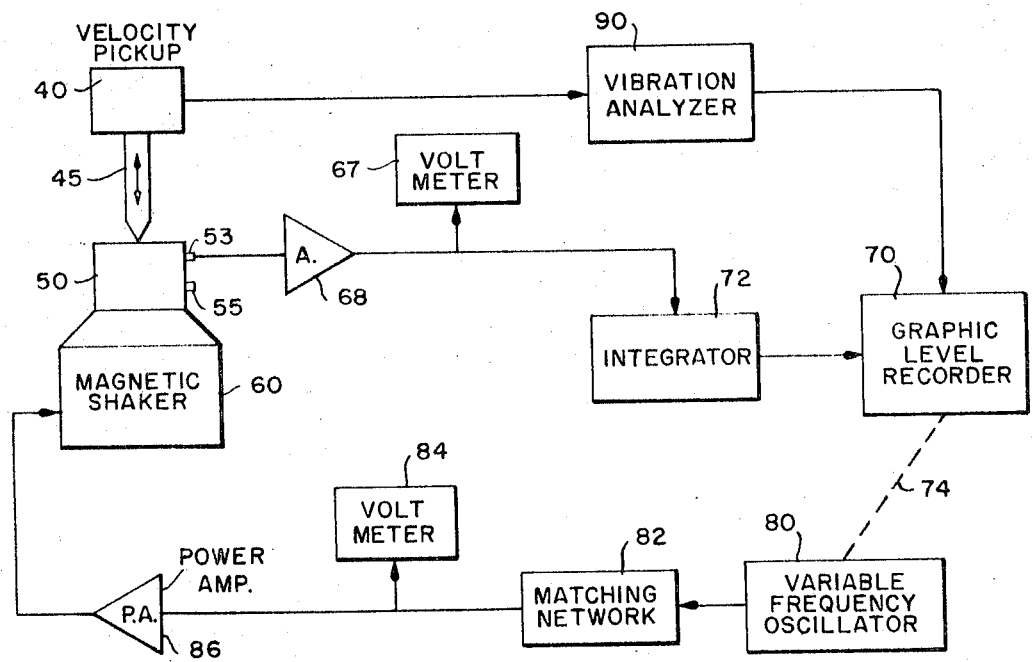
FIG. 3 is a circuit diagram of the vibration analyzer calibration system.

Vibration analyzer 90 together with pickup 40 may be calibrated together in accordance with the system shown in FIG. 3 which is similar to the system used to calibrate pickup 40 alone except that the output of the now-calibrated pickup 40 is fed directly to the input of vibration analyzer 90 and thence to an input of graphic recorder 70. Oscillator 80 is swept through the frequency range of interest driving magnetic shaker 60 through power amplifier 86. Probe 45 of pickup 40 is caused to vibrate in unison with impedance head 50.

The output of pickup 40 is fed to the input of vibration analyzer 90. An output connection is made to analyzer 90 and fed into an input of recorder 70.

The acceleration voltage output 53 of reference impedance head 50 is amplified by amplifier 68 and fed to integrator 72 which integrates the incoming signal thus changing the acceleration voltage function to a function representative of velocity. The output of integrator 72 is connected to an input of recorder 70.

To calibrate the pickup 40 and vibration analyzer 90, the oscillator is swept through the frequency range of interest, 50 c.p.s. to 10.8 kc./s., thus driving impedance head 50 and pickup 40 by magnetic shaker 60. The velocity function voltage from integrator 72 is used as a reference against which the velocity output of analyzer 90 may be compared and calibrated as a function of frequency from the resulting graph charted by recorder 70. For this purpose, the sensitivity of analyzer 90 is either known or may be ascertained by feeding a signal from an oscillator in and reading the output on a high impedance voltmeter. The oscillator is swept through the frequency range of interest as the voltmeter reading is noted.

Figure 4:
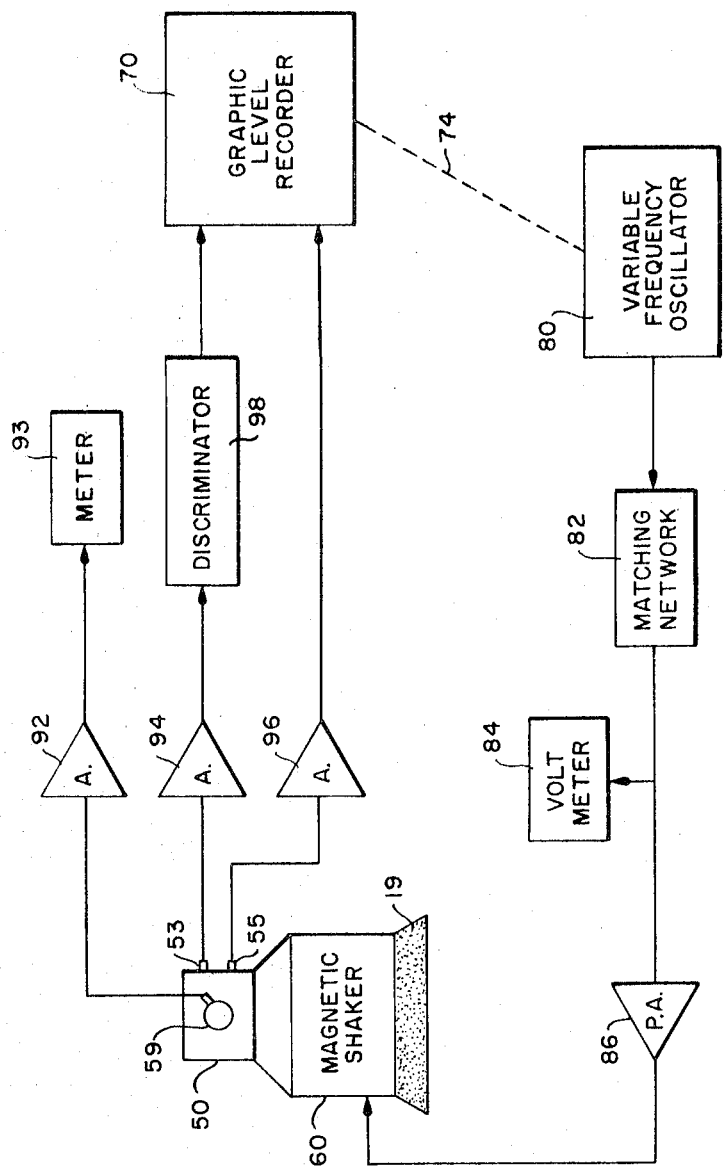
FIG. 4 is a circuit diagram of the arrangement used to check calibration system malfunctioning.

FIG. 4 shows the self-checking feature of the invention which enables the operator to readily ascertain any malfunctioning of the calibration system itself.

The self-checking system includes magnetic shaker 60 mounted on shock absorbing resilient material 19 to lower the natural frequency of the system so as to avoid spurious responses. Reference impedance head 50 is mounted on shaker 50 and is provided with a cross-axis accelerometer 59.

Cross-axis accelerometer 59 is a transducer which converts mechanical motion to electrical voltages. The purpose of accelerometer 59 is to determine whether any skewing or deviation from axial motion occurs in the shaker 19 or impedance head 50. When operating properly, neither the impedance head 50 nor shaker 60 should exhibit any deviation from axial motion. The cross-axis accelerometer 59 will respond to such motion and generate a proportional voltage signal. The signal is amplified by amplifier 92 and indicated on a suitable meter 93. The operator can readily ascertain any malfunctioning in shaker 60 or impedance head 50 by looking for an indication on meter 93.

A further check for malfunctioning involves comparing the acceleration output 53 and force output 55 of impedance head 50. Force voltage output 55 is amplified by amplifier 96 and fed to an input of recorder 70. Acceleration voltage output 53 is fed to amplifier 94 and thence to discriminator 98. Discriminator 98 changes the A.C. acceleration voltage into a D.C. analogue for use as a reference. A connection is made from discriminator 98 to an input of recorder 70. Recorder 70 is connected by mechanical drive 74 to variable frequency oscillator 80 and both units are driven synchronously as heretofore described. Oscillator 80 drives shaker 60 via matching network 82 and power amplifier 86 through the frequency range of interest.

The theory of operation involves the principle that in a closed system, mass is a constant quantity. According to Newton's law, mass equals the ratio of force to acceleration. Thus by charting the ratio of the force voltage to acceleration voltage from the outputs of impedance head 50 over the frequency range of interest, any irregularities will be readily apparent since the ratio should have a constant value and thus graph as a straight line of zero slope as frequency is varied through the range. This result gives a fail-safe indication of malfunctioning of the calibration system as a whole since any changes in the gains of the system or of the transducer sensitivities will be reflected in the recorder output. The faulty component may then be found by individual component checks. Consequently, before calibrating the vibration analyzer 90, the operator can run a rapid and easy check on the calibration system itself.

Because the calibration system of the invention uses standard, widely-available components, it is possible to achieve interlaboratory reproducibility of the calibration procedure. Furthermore, the calibration procedure is simple and straightforward permitting relatively unskilled personnel to perform it.

Furthermore, the invention may be used to perform the calibration procedure on any type transducer vibration testing apparatus such as displacement, acceleration or jerk in accordance with the basic principles set forth herein.

Obviously many modifications and variations of the present invention are possible within the above principles of the invention.

What is claimed is:

1. Apparatus for calibrating a system for analyzing vibrations comprising:
    electrical oscillation generating means;
    means for generating mechanical motion in response to said electrical oscillations;
    first and second means for converting said mechanical motion to respective first and second electrical outputs;
    means connecting the electrical output of one of said converting means to a vibration analyzing system;
    means for comparing the electrical output of said vibration analyzing system and the electrical output of the other of said converting means;
    said first converting means comprising a transducer for converting said mechanical motion to an electrical output representative of the instantaneous velocity associated with said motion; and
    said second converting means comprising a transducer for converting said mechanical motion to an output representative of the instantaneous acceleration associated with said motion and integrator means for converting said acceleration-representative output to an electrical output representative of velocity.

2. Apparatus for calibrating a system for analyzing vibrations as set forth in claim 1 wherein:
    the output of said vibration analyzing system is referenced to the output of said integrator means;
    said comparing means including a graphic level recorder.

3. Apparatus for indicating malfunctioning of a calibration system comprising:
    means for generating a mechanical motion in response to electrical oscillations;
    means for converting said mechanical motion to an electrical signal representative of the instantaneous force associated with said motion;

means for converting said mechanical motion to an electrical signal representative of the instantaneous acceleration associated with said motion; and means for indicating the ratio of the force-representative signal to the acceleration-representative signal;

said motion generating means comprising a magnetic shaker for generating vibratory motion substantially along a given axis; and means for indicating components of vibratory motion in directions other than said axial direction.

References Cited

Moskowitz: Accelerometer Calibration, Instruments and Control Systems, March 1961, vol. 34, No. 3, pp. 467, 468, 469 and 470.

S. CLEMENT SWISHER, Primary Examiner